United States Patent [19]

Miller

[11] 4,332,474
[45] Jun. 1, 1982

[54] METHOD AND APPARATUS FOR TESTING THE ORIENTATION OF CRYSTAL PLATES

[75] Inventor: Anton J. Miller, Allentown, Pa.

[73] Assignee: Bell Telephone Laboratories, Incorporated, Murray Hill, N.J.

[21] Appl. No.: 158,400

[22] Filed: Jun. 11, 1980

[51] Int. Cl.³ .............................................. G01J 4/00
[52] U.S. Cl. ................................... 356/366; 356/351; 356/31
[58] Field of Search ................. 356/31, 351, 361, 364, 356/366

[56] References Cited

U.S. PATENT DOCUMENTS

| | | | |
|---|---|---|---|
| 1,766,037 | 6/1930 | Dawson | 356/31 |
| 2,352,072 | 6/1944 | Bond | 356/31 |
| 2,497,070 | 2/1950 | Coleman | 356/31 |
| 3,052,152 | 9/1962 | Koester | 350/400 |

*Primary Examiner*—R. A. Rosenberger

*Attorney, Agent, or Firm*—Lester H. Birnbaum

[57] ABSTRACT

A method and apparatus for checking the orientation of crystal plates in a stacked configuration. The plate stack (15) is placed between a polarizer (11) and analyzer (12). A cylindrical lens (13) placed between the stack and analyzer is utilized as a convergent element. Included with the stack are reference plates (17, 18) having known orientation angles representing the upper and lower limits of the desired orientation tolerance. Monochromatic light is made incident on one surface of the plates in the stack through the polarizer. Since the crystals are birefringent, an interference pattern will be produced by light emerging from the opposite surface. Due to the presence of the cylindrical lens, this pattern can be viewed as a series of essentially linear, parallel bands of light. Deviations within a particular band are compared with bands produced by the reference plates to determine if the angle of each plate falls within the desired limits.

13 Claims, 5 Drawing Figures

METHOD AND APPARATUS FOR TESTING THE ORIENTATION OF CRYSTAL PLATES

BACKGROUND OF THE INVENTION

This invention relates to the fabrication of crystal plates, and in particular to a method and apparatus for batch testing the crystallographic orientation of the plates.

Crystal plates, such as quartz, are useful in a wide variety of piezoelectric devices such as filters and oscillators. In many of such devices, a precise crystallographic orientation angle for each plate is often a key element in acceptable performance. In accordance with the usual prior art process, the crystallographic orientation of each plate is determined after all lapping and grinding by x-ray analysis making use of the Bragg conditions for reflection. While such techniques are accurate, they require that each plate be checked on an individual basis which, of course, adds considerably to processing time and the cost of fabrication.

It is therefore a primary object of the invention to provide a method and apparatus which will allow batch testing of the crystallographic orientation of crystal plates.

SUMMARY OF THE INVENTION

This and other objects are achieved in accordance with the invention. In accordance with the method, a stack of birefringent crystal plates is placed between first and second polarizing elements wherein there is also included a cylindrical lens between the stack and the second polarizing element. Included adjacent to the stack is a pair of reference plates having crystallographic orientations at the extremes of a desired orientation range for the plates in the stack. Light is made incident on one surface of the stack and reference plates through the first polarizing element so that light emerging from the other surface will be focused by the lens and upon emerging from the second polarizing element will form an interference pattern comprising a series of essentially parallel light and dark bands with variations in the position of portions along each band being a function of the orientation angle of a plate corresponding to that portion. The position of the center of these portions along at least one band is compared with a particular band produced by each reference plate to determine if the portions fall within the reference bands.

BRIEF DESCRIPTION OF THE DRAWING

These and other features are delineated in detail in the following description. In the drawing.

It will be understood that for purposes of illustration these figures are not drawn to scale.

DETAILED DESCRIPTION

Prior to testing, the crystal plates are prepared in accordance with standard techniques. For example, in the preparation of standard quartz plates having a $+5°$ X orientation angle, a block of crystal having such orientation is first sawed into half sections, then into subsections and then slurry cut into wafers. The wafers are then lapped to the desired final thickness and stacked onto a glass support plate so they can be split into stacks of plates having the approximate desired width. Each stack is then ground and lapped to the desired final plate width.

At this point in the processing, it is desirable to check the orientation angles of the plates to be sure each falls within a certain tolerance. In accordance with the present invention, this can be done while the plates are in the stacked configuration. Before testing, it is recommended for best results to be sure that each plate in the stack has its optical axis pointing in the same direction (in this case either in the $+X$ or $-X$ direction). This can be done by a number of methods including proper marking or groove formation in the quartz block prior to wafering, or individually sorting the wafers by x-ray analysis or other techniques after the final thicknesses have been formed and before the plates are stacked for the final width fabrication.

Figure 1:
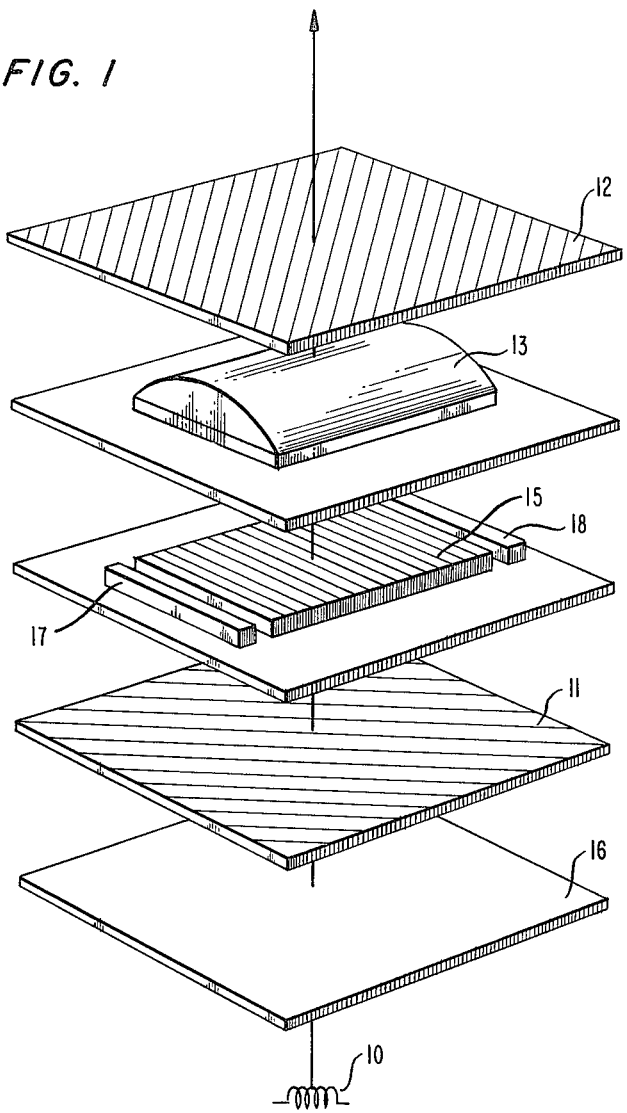
FIG. 1 is a schematic, perspective view of an apparatus in accordance with one embodiment of the invention.
Figure 2:
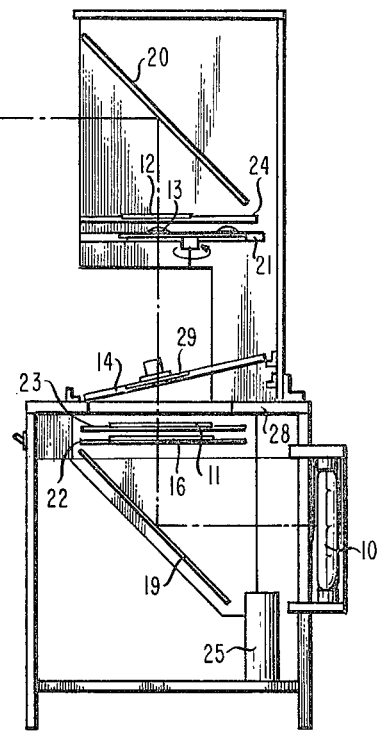
FIG. 2 is a more detailed side view of an apparatus in accordance with the same embodiment.

An apparatus in accordance with one embodiment of the invention which may be used for testing orientation angles in accordance with one example of the method of the invention is illustrated in a highly schematic perspective view in FIG. 1 and a more detailed side view in FIG. 2. Schematic and perspective views of the platform on which the stacks are mounted are shown, respectively, in FIGS. 3 and 4. Similar elements in these figures are similarly numbered.

As shown in FIG. 1, the basic components of the apparatus include a source of monochromatic light, 10, a first polarizing element, 11, a second polarizing element, 12, usually referred to as an analyzer, and a cylindrical lens, 13, placed between the polarizing elements. A light diffuser, 16, was positioned between the light source and first polarizing element. A platform, 14, was provided between the first polarizing element and the lens for positioning a stack of crystal plates, 15, whose orientation angles are to be tested.

Included adjacent the stack of plates were a pair of reference plates 17 and 18 with known orientation angles. These angles are the upper and lower limit of the desired angle tolerance for the plates in the stack. In this particular example, plate 17 had an orientation angle of $+5°,5'$ and plate 18 had an orientation angle of $+4°45'$. The plate stack was placed so that one major surface (which included the long dimension of the plates) faced the first polarizing element and the opposite surface faced the cylindrical lens. It will be noted in FIGS. 2 and 3 that the platform, 14, on which the plates were supported was tilted an angle, $\Theta$, with respect to the benchtop 28. This was done to place the path of light at a sufficiently large angle, $\Theta'$, with respect to the optic axis of the plates to insure a sufficient number of interference bands. Since the number of interference bands will be a function of the tilt angle, $\Theta'$, as well as the width of the plates in the stack (which constitutes the thickness dimension of the stack), it is desirable to keep these values constant. In this example, the platform was tilted so as to give a tilt angle, $\Theta'$, of approximately 15 degrees for plate thicknesses of $\geq 5$ mm and approximately 25 degrees for plate thicknesses of $<5$ mm. From FIG. 3, it will be realized that to achieve these angles, the platform had to be tilted at angles of 10 degrees or 20 degrees, respectively, in order to take into account the orientation angle, $\alpha$, that the normal to the plate surface makes with the optic axis, which in this example is nominally 5 degrees. Uniform thickness of each plate in the stack is assured since during the normal processing the plates will have been double face lapped by this point in the fabrication.

Figure 4:
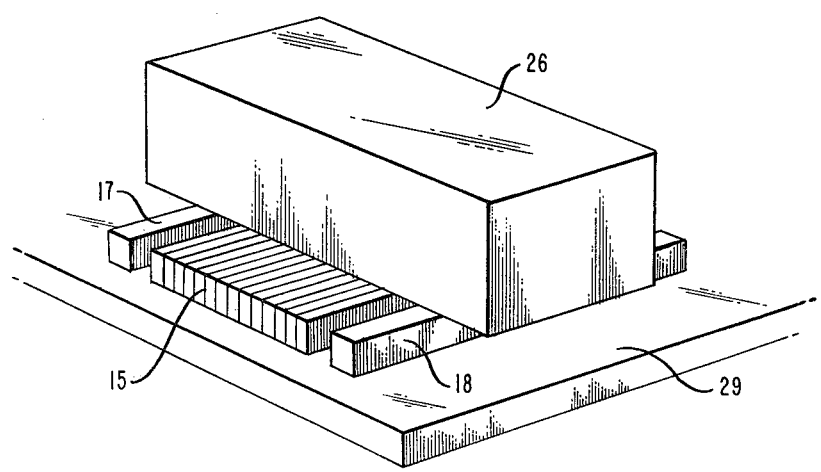
FIG. 4 is a perspective view of a stack of crystal plates to be tested and reference plates mounted in accordance with the same embodiment.

As shown in FIG. 4, the reference plates, 17 and 18, were mounted on glass platform 29 and held in place by a fixture 26 of transparent glass. The stack of crystal plates, 15, could then be inserted under the fixture in the area between reference plates. It is desirable to choose reference plates which have approximately the same height as the stack. In order to give proper clearance for insertion of the stack, it is recommended that the reference plates be 0.01–0.02 mm greater in height than the stack. For optimum light transmission, a liquid of the same refractive index as the plates can be deposited in the gap between the fixture and stack.

As shown in FIG. 2, the light source was mounted in the rear of the apparatus housing. Mirror 19 was used to direct the light beam toward the stack and mirror 20 was used to reflect the emerging light in a horizontal direction to permit convenient observation. A plurality of cylindrical lenses, 13, were mounted on a wheel, 21, to permit rotation of the desirable lens into the path of light. The lens is positioned so that the neutral axis of the lens (which is parallel to the long side of the lens) is perpendicular to the length dimension of the plates in the stack. The light diffuser 16, and first and second polarizing elements, 11 and 12, were all mounted in plexiglass trays, 22, 23 and 24, respectively. A transformer, 25, provides the proper voltage to the light source.

In this particular example, the monochromatic light source, 10, was a sodium bulb emitting light of wavelength 5890 Angstroms. The light diffuser was an opaque plate of acrylic material. The first and second polarizing elements were standard H-sheet polarizing plates made by Polaroid. The particular lenses employed were glass with focal lengths varying from 150–250 mm depending upon the thickness of the reference plates and stacks. The thickness of the stacks varied from 1.3 to 6 mm. It should be realized, however, that the invention would be useful for any stack thickness. The distance between the stack 15 and lens 13 was 15 cm, between the first polarizer 11 and the stack was 5 cm, and between the lens and the second polarizer was 2 cm.

Figure 3:
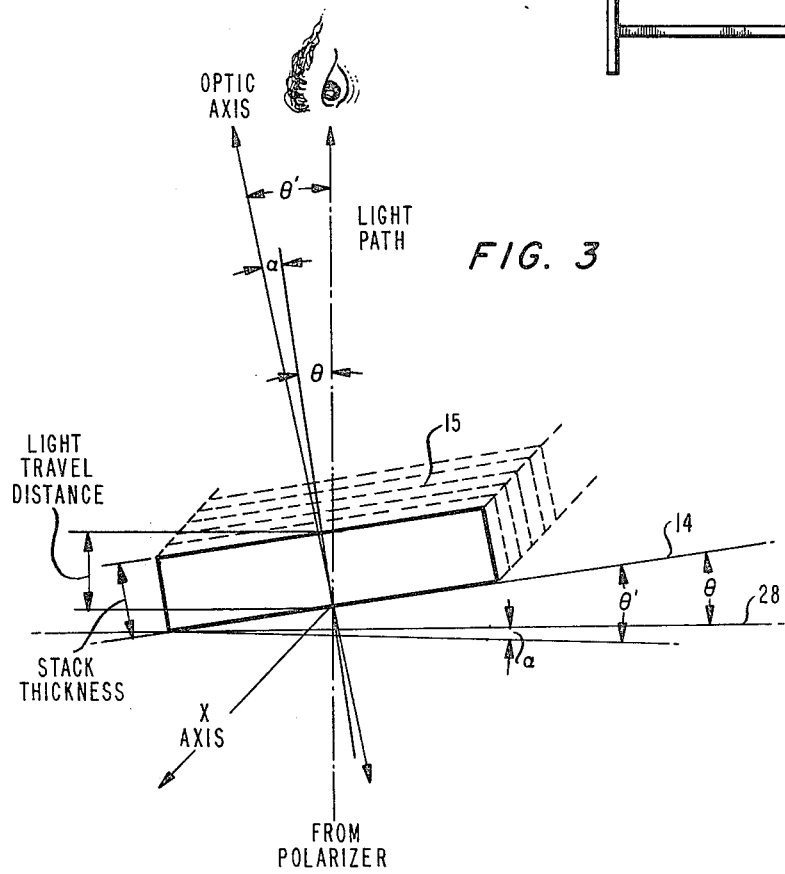
FIG. 3 is a side schematic view of a stack of crystal plates to be tested in accordance with the same embodiment of the invention.
Figure 5:
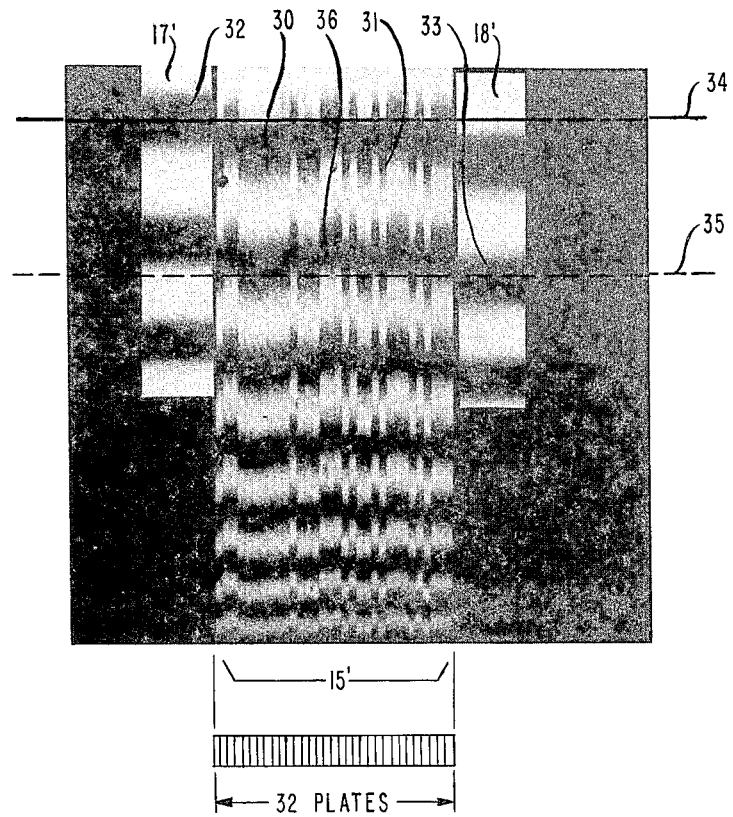
FIG. 5 is a representation of a typical interference pattern produced in accordance with one embodiment of the invention.

In operation, light from the source 10 follows the path indicated in FIG. 2. The light is first diffused by element 16 and then polarized by element 11 to form a plane polarized light beam at an angle of 45 degrees with respect to the long axis of the stack (the X' axis). The beam is then incident on one surface of the plate stack. As illustrated in FIG. 3, due to the tilt of the platform, 14, the light will be incident at some angle, $\Theta'$, with respect to the optic axis of the plates. Since the plates are birefringent, the light is broken up into slow and fast moving wavefronts which vary in phase and in their states of polarization. The light emerging from the opposite surface of the stack is focused by lens 13 onto the second polarizing element 12 which is oriented at an angle of 45 degrees with respect to the long axis of the stack (90 degrees relative to the first polarizing element). Light which is plane polarized will be extinguished by the second polarizer, while other states of polarization will pass through. The interference pattern thus emerging from the second polarizing element takes the form of a series of essentially linear light and dark bands as illustrated in FIG. 5. Shown in an approximate representation of an interference pattern, 15', of 32 plates, and patterns, 17' and 18' for the reference plates which represent the upper and lower limit respectively of desired orientation angles. Each band (e.g., 30) comprises portions (e.g., 31) which correspond to each plate in the stack being tested. It will be noted that the vertical position of each portion along the band will vary. Since the angle of inclination and the thickness of each plate in the stack is essentially constant, this variation in position is due to the variation in the orientation angle of each plate. To determine which plates have orientation angles within the desired tolerances, one examines one or two of the bands and compares them with the nearest band produced by one or both of the reference plates, in this case bands 32 and 33. As mentioned previously, these plates give the upper and lower limit of permissible orientation angles. A quick visual inspection can determine if the center of any portion of the band falls outside the bands of the reference plates. If so, the plate corresponding to that portion is outside the desired tolerance and can be discarded or have its angle corrected in subsequent processing.

If desired, a guideline generated by a small gap in the analyzer may be utilized to compare the bands. This is the solid line 34 indicated in FIG. 5. The guideline was first centered on one of the dark bands (32) resulting from one of the reference plates and a visual comparison made as to whether the center of any portion of the band (30) being examined fell above this line. The guideline was then moved to the position indicated by the dashed line 35 centered on one of the bands (33) from the other reference plate. Band 36 was examined to see if the center of any portion fell below this line (if desired only one band from pattern 15' need be examined). The guideline can be moved since the tray 24 is slidably mounted in the housing.

In the particular example shown, the tolerance is $\pm 15'$ about the desired +5 degrees X orientation. The plate in position 17 looks like it is outside the upper limit, while plate in position 28 should also be discarded. It was found that, typically, variations of orientation angles of $\pm 2'$ from the outside limits could be detected. (It should be realized that FIG. 5 is not intended to be an exact reproduction of the interference pattern and is presented for illustrative purposes.)

The choice of a proper focal length of the cylindrical lens is important since the number of fringes will be inversely proportional thereto. The appropriate lens can be determined empirically for a particular thickness of the stack by rotating the wheel 21 and observing the number of fringes produced. For best observation, it is recommended that five bands be produced over a distance of approximately one inch. For example, with a platform tilt of 25 degrees and plate thicknesses of 1.5, 2.5 and 5 mm, cylindrical lenses having focal lengths of 150, 200 and 250 mm appeared optimum.

Although the invention has so far been described in terms of a direct visual comparison of the position of the portions, it should be realized that other techniques can be employed. For example, a standard laser scanner can be used to scan the pattern horizontally along the reference bands and provide a readout of light intensity of each portion of the band being investigated to determine if any portion falls outside the reference. If desired, several horizontal scans could be used to insure accuracy. One such apparatus which might be employed, for example, is a laser scanning densiometer. Since such types of apparatus are well known to those in the art, the details are not discussed. Although the particular plates utilized in these examples were quartz, it should be realized that any birefringent crystal plates may be tested in accordance with the invention. Further, although a particular crystal orientation has been described, any orientation can be tested by using the basic techniques described herein.

Various additional modifications will become apparent to those skilled in the art. All such variations which basically rely on the teachings through which the invention has advanced the art are properly considered within the spirit and scope of the invention.

I claim:

1. A method for testing the crystallographic orientation angle ($\alpha$) of a stack (15) of birefringent crystal plates characterized in the steps of: placing the stack between a first polarizing element (11) and a second polarizing element (12) where there is also included a cylindrical lens (13) between the stack and second polarizing element; including with said stack a pair of reference plates (17, 18) having crystallographic orientations at the extremes of a desired orientation range for the plates in the stack; shining light onto one major surface of said stack and reference plates through said first polarizing element so that light emerging from the opposite surface will be focused by the lens and upon emerging from the second polarizing element will form an interference pattern comprising a series of essentially linear, parallel light and dark bands (30) with variations in the position of portions (31) along each band being a function of the orientation angle of a plate corresponding to that portion; and comparing the positions of the center of the portions along at least one band with a particular band (32, 33) of the interference pattern produced by each reference plate to determine if the portions fall within the reference bands.

2. The method according to claim 1 where the stack and reference plates are mounted on a platform (14) which is tilted so that the light is incident on the surface of the stack at a predetermined angle ($\Theta'$) with respect to the optic axis of the plates.

3. The method according to claim 2 wherein the angle of the light with respect to the optic axis is within the range ±45 degrees.

4. The method according to claim 1 wherein the optic axes of all plates in the stack are pointing in the same direction.

5. The method according to claim 1 wherein the height of the stack lies within the range 1.3 to 6 mm.

6. The method according to claim 1 wherein the height of the reference plates lies within the range 1.3 to 6 mm.

7. The method according to claim 1 wherein the focal length of the lens lies within the range 150 to 250 mm.

8. The method according to claim 1 wherein the position of the center of each portion relative to the reference bands is determined by laser scanning the interference pattern.

9. The method according to claim 1 wherein the stack and reference plates are kept in place by a fixture (26) of a transparent material.

10. The method according to claim 1 wherein the crystal comprises quartz.

11. The method according to claim 1 wherein the crystallographic orientation angle of each plate is nominally +5 degrees relative to the optic axis.

12. A method for testing the crystallographic orientation angle ($\alpha$) of a stack (15) of birefringent crystal plates characterized in the steps of: arranging each plate in the stack so their optical axes lie in the same direction; placing the stack on a platform (14) which lies between a first polarizing element (11) and a second polarizing element (12) wherein there is also included a cylindrical lens (13) between the stack and the second polarizing element and having its axis perpendicular to the length dimension of each plate, the said platform being tilted so as to form a predetermined angle ($\Theta'$) between the optical axis of each plate and the light beam to be incident on the stack; including adjacent the stack on said platform a pair of reference plates (17, 18) having crystallographic orientations at the extremes of a desired orientation range for the plates in the stack; shining monochromatic light into one major surface of said stack and reference plates through said first polarizing element so that light emerging from the opposite surface will be focused by the lens and upon emerging from the second polarizing element will form an interference pattern comprising a series of essentially linear, parallel light and dark bands (30) with variations in the position of portions (31) along each band being a function of the orientation angle of a plate corresponding to that portion; and comparing the positions of the center of the portions along at least one band with the nearest band (32, 33) of the interference pattern produced by each reference plate to determine if the portions fall within the reference bands.

13. A method for testing the crystallographic orientation angle ($\alpha$) of a stack (15) of quartz crystal plates which nominally have a value of +5 degrees relative to the optic axis and essentially uniform widths of 1.3 to 6 mm, characterized in the steps of: arranging each plate in the stack so their optical axes lie in the same direction; placing the stack under a transparent fixture (26) on a platform (14) which lies between a first polarizing element (11) with its alignment axis approximately 45 degrees relative to the length dimension of the plates and a second polarizing element (12) with its alignment axis approximately 90 degrees relative to the alignment axis of the first polarity element where there is also included a cylindrical lens (13) between the stack and the second polarizing element and having a focal length within the range 150 to 250 mm and its axis perpendicular to the length dimension of each plate, the said platform being tilted so as to form a predetermined angle within the range −45 to +45 degrees between the optic axis of each plate and the light beam to be incident on the stack; including adjacent to the stack on said platform a pair of reference plates (17, 18) having thicknesses of 0.01–0.02 mm greater than that of the stack and crystallographic orientations at the extremes of a desired orientation range for the plates in the stack; shining monochromatic light onto one major surface of said stack and reference plates through said first polarizing element so that light emerging from the opposite surface will be focused by the lens and upon emerging from the second polarizing element will form an interference pattern comprising a series of essentially linear, parallel light and dark bands (30) with variations in the position of portions (31) along the band being a function of the orientation angle of a plate corresponding to that portion; and comparing the positions of the center of the portions along at least one band with the nearest band (32, 33) of the interference pattern produced by each reference plate to determine if the portions fall within the reference bands.

* * * * *